United States Patent [19]  [11] 3,816,049
Peppler  [45] June 11, 1974

[54] MOLDING APPARATUS FOR PRODUCING DECKLE-FREE EDGES AND WINDOWS IN MOLDED FIBER PRODUCTS

[75] Inventor: William S. Peppler, Chappaqua, N.Y.

[73] Assignee: Diamond International Corporation, New York, N.Y.

[22] Filed: June 29, 1972

[21] Appl. No.: 267,375

[52] U.S. Cl.................................. 425/324, 425/387
[51] Int. Cl............................. B29c 3/00, B29j 5/00
[58] Field of Search................... 425/327, 324, 387; 249/66 A; 162/391, 399, 400

[56] References Cited
UNITED STATES PATENTS
2,094,823  10/1937  Sample et al. ................. 425/227 X
2,977,633  4/1961  Breitenstein .................... 425/324 X Primary Examiner—Robert L. Spicer, Jr.
Attorney, Agent, or Firm—Karl W. Flocks

[57] ABSTRACT

Apparatus and method for forming deckle-free edges and windows in molded fiber products such as cartons, trays and the like, said apparatus comprising a forming mold equipped with non-porous block-out ridge and/or patch members to define the periphery and/or windows in the finished product. The apparatus includes a mating press mold for cooperation with the forming mold with passageways therein through which jets of fluid such as air and/or steam may be supplied from a high pressure source to control deckle accumulated on the forming mold. The method of forming deckle-free windows and/or edges in molded fiber products by applying a fiber pulp slurry on the face of a forming mold and removing deckle from block-out portions of said forming mold by directing high pressure jets of fluid at said mold to blast deckle into upstanding position and away from adjacent portions of said mold and pressing the upstanding deckle down into pulp therebelow thereby concentrating fiber in the vicinity of edges and windows in the finsihed product.

9 Claims, 4 Drawing Figures 3,816,049

MOLDING APPARATUS FOR PRODUCING DECKLE-FREE EDGES AND WINDOWS IN MOLDED FIBER PRODUCTS

BACKGROUND OF THE INVENTION

1. Field of the Invention

The field of the invention is believed to encompass art found in Class 162, subclasses 227 and 286.

2. Description of the Prior Art

In the production of molded fiber products it is frequently desirable to form one or more apertures or windows therein, in particular in cartons or trays. The windows are formed by providing the forming molds with non-porous block-out patches or blocks. Concomitant with the use of block-out patches there is a buildup of undesirable fiber known as deckle, around the edge of the windows. The formation of deckle also occurs in the vicinity of the periphery of the product, particularly if the periphery of the product is surrounded by an elevated shoulder portion of the forming mold. The removal of this undesirable fiber or deckle has been approached in the past, for example, by the application of water sprayed in the area of the pulp buildup to remove the deckle. The use of water spray to remove deckle has not been altogether satisfactory in that (a) stray fibers frequently remain around the periphery of the article or around the edge of the windows, (b) thickness of pulp formation in the deckle area may be adversely thinned out, (c) pulp furnish in machine vat may be diluted, and (d) manufacturing time is undesirably extended.

Other approaches for removing deckle include the use of air as disclosed in U.S. Pat. No. 2,923,654 to Comstock. It is noted that Comstock uses air in the vacuum forming die to remove deckle. The specific approach of Comstock complicates the die construction, die changing on the machine, and machine construction. Its practical use is for a very small area on a special purpose machine.

SUMMARY OF THE INVENTION

The present invention relates to improvements in an apparatus and a process for use in forming molded fiber products. In particular it is an object of this invention to provide an apparatus and method for forming molded fiber products with deckle-free surrounding edges and/or deckle-free openings or windows therein.

It is also an object of this invention to facilitate the production of molded fiber products with edges having sharp clean lines. It is another object of this invention to form a molded fiber product with windows and other edges thereof having a higher concentration of material therearound to reinforce these areas.

It is additionally an object of this invention to provide an apparatus and method for increasing the speed of manufacturing deckle-free edges in molded fiber products.

DETAILED DESCRIPTION OF THE APPARATUS ACCORDING TO THIS INVENTION

Figure 1:
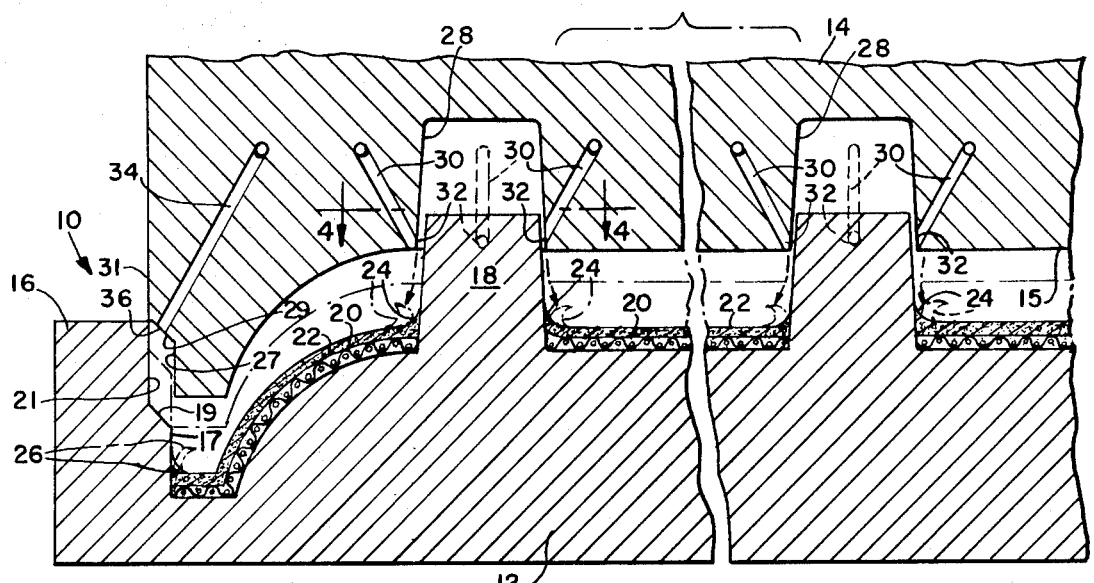
FIG. 1 is a fragmentary elevational view in section of the apparatus according to this invention showing a buildup of deckle around the edges of elevated non-porous block-out portions of the forming mold.
Figure 2:
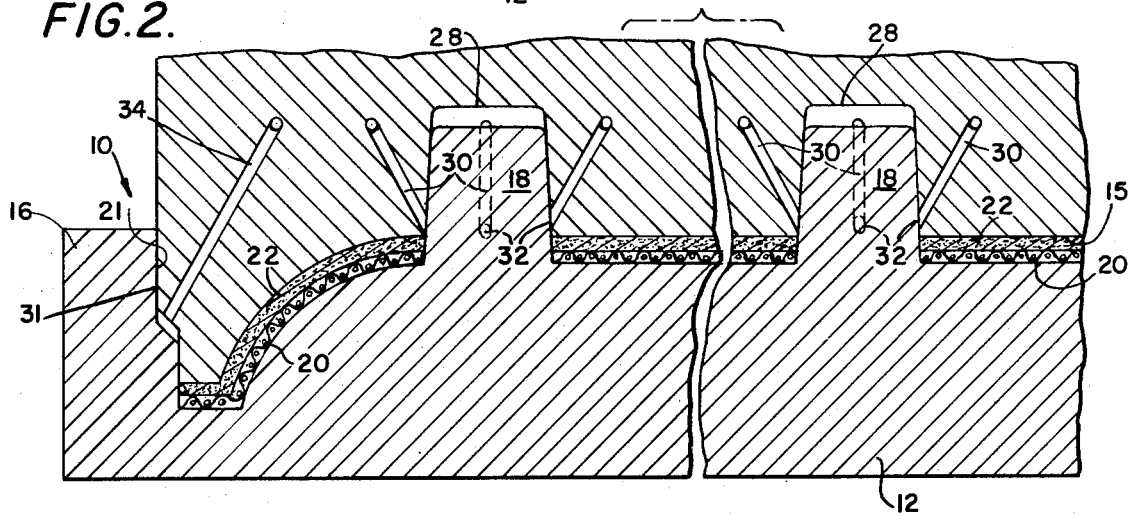
FIG. 2 is a view similar to FIG. 1 wherein the press mold is lowered into mating relationship with the forming mold.

Referring now particularly to FIGS. 1 and 2, the molding apparatus 10 according to the present invention is seen to include a forming mold 12 and a mating press mold 14 having a pressing face 15. To define the outer surrounding edge of a molded fiber product forming mold 12 is provided with surrounding elevated ridge 16. Ridge 16 includes a first vertical portion 17 which defines the periphery of the product to be molded, an oblique portion 19 extending upwardly and outwardly from vertical portion 17 and a second vertical portion 21 extending upwardly from oblique portion 19, the purpose of which will become obvious hereinbelow. Forming mold 12 also includes one or more elevated non-porous block-out patches 18 to prevent formation of pulp in the space occupied thereby for forming windows. Disposed on the working surface of the forming mold is a conventional wire screening 20 which is well known in the prior art. A fiber pulp slurry 22 as shown is accumulated on top of the wire screen 20. Formation of deckle 24 is indicated along the lower sides of block-out patch 18. Also peripheral deckle 26 is formed against the lower portion of ridge 16.

Press mold 14 as mentioned above comprises a lower or pressing face 15 and is generally contoured to mate with the working face of forming mold 12. Cavities 28 are provided in press mold 14 to allow passage of block-out patches 18 thereinto during pressing operations. A plurality of passageways 30 are formed in the press mold 14 each of which discharge through an exit 32 adjacent the lower edge of the cavity 28. The passageways 30 are strategically disposed around cavity 28 at 90° intervals. Each of the passageways 30 communicate with a high pressure fluid supply source of air and/or steam, not shown. Press die 14 comprises a circumferential portion including a first vertical portion 27, an oblique portion 29 extending upwardly and away from portion 27 and a second vertical portion 31 extending upwardly from oblique portion 29. It is clear from FIGS. 1 and 2 that in operation of the apparatus vertical portions 17 and 21 of forming mold 12 will be in sliding contact with vertical portions 27 and 31, respectively of press mold 14 and that the vertical portions 17, 21, 27 and 31 together with oblique portions 19 and 29 form an expandable chamber. The chamber thus formed extends around the periphery of the apparatus. Strategically arranged around press mold 14 is a plurality of spaced apart passages 34 with exits 36 disposed in the oblique portion 29 thereof. Each of the passages 34 is connected to a common high pressure fluid supply source of air and/or steam which is not shown.

METHOD AND OPERATION OF THE APPARATUS TO FORM DECKLE-FREE EDGES IN A MOLDED FIBER PRODUCT

In the production of a molded fiber product press mold 14 is withdrawn so as to be clear of forming mold 12 to which a fiber pulp slurry 22 may be applied by dipping into a pulp bath, for example. As would normally be expected in such a process there is a buildup of deckle 24 around the window patches 18 and also deckle 26 around and against the lower portion of surrounding ridge 16 as shown in FIG. 1. The deckle 24 and 26 by operation of the present apparatus is curled away from the base of the relatively tall block-out patches 18 and tall ridge 16 by application of high pressure fluid supplied from a source to passageways 30 and 34 with the air discharging at exit ports 32 and 36, respectively.

Figure 4:
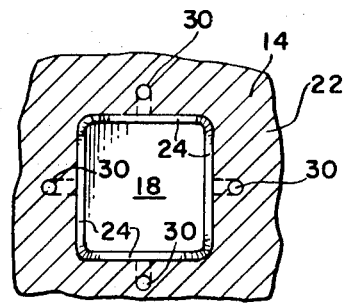
FIG. 4 is a view of the apparatus taken along the line 4—4 in FIG. 1.

It is clear from FIG. 1 that as press mold 14 is lowered into the position illustrated in FIG. 1, high pressure fluid discharges out of exits 32 down along the walls of the block-out patches 18, thereby peeling the deckle 24 from the base thereof to the upstanding position illustrated in phantom. With fluid jets all around the deckle area of the relatively tall blockout patches 18 as illustrated in FIG. 4, the deckle can be curled away from the walls and into the path of the approaching press mold face. After the pressing action, and subsequent drying, the fibers that had been deckle become an integral part of the article to provide a reinforced buildup of material around the window or opening.

Figure 3:
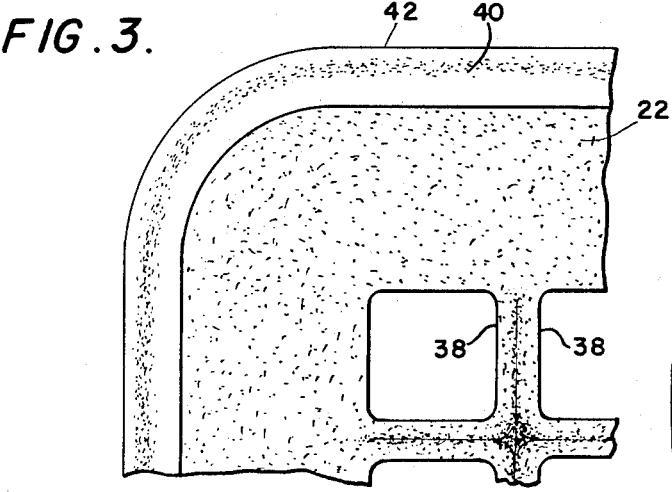
FIG. 3 is a fragmentary plan view of a preform of FIG. 2 with the molds omitted for convenience.

At the same time deckle is blasted away from block-out patches 18, high pressure fluid distributed in passageways 34 around press mold 14 is discharged through exits 36 into the chamber formed by the offset portions formed by the peripheral walls of forming molds 12 and 14 which equally distributes pressure all around the entire press mold to curl away deckle 26 formed at the base of ridge 16 prior to contact of the press mold with the deckle zone. As the peripheral deckle 26 is curled away from the base of ridge 16 to the phantom position illustrated in FIG. 1, press mold 14 continues on its downward travel until it comes in contact with the upstanding deckle 26 and flattens it into the rim portion of the fiber pulp molded preform. Thereafter with press mold 14 withdrawn free of forming mold 12 the fiber product preform 22 as shown in FIG. 3 comprises a plurality of windows 38 with deckle-free clearly defined sharp edges all around and a rim portion 40 with a deckle-free sharp edge 42.

It will be obvious to those skilled in the art that various changes may be made without departing from the scope of the invention and the invention is not to be considered limited to what is shown in the drawings and described in the specification.

I claim:

1. Molding apparatus for forming deckle-free edges in molded fiber products comprising a forming mold with relatively tall non-porous block-out portions for preventing formation of pulp and thereby forming windows and edge portions thereof in said products in combination with a press mold contoured for mating engagement with said forming mold for pressing cooperation therewith, said pressing mold being characterized in that it is equipped with fluid passage means for communication with a source of high pressure fluid such as air and/or steam, said passage means having exits whereby high pressure fluid may be directed against said forming mold to curl deckle therefrom and into an upstanding position so that as said press mold continues on its downward stroke said deckle will be pressed thereby into fiber portions of the product around the edges to be formed therein.

2. The apparatus as recited in claim 1 wherein said non-porous block-out portions include one or more relatively tall post-like members for forming windows in the finished product, said press mold includes cavity means for mating engagement with each of said post-like members, and with a number of said exits in said cavity means directed at said post-like member.

3. The apparatus as recited in claim 2 wherein said number of exits of said fluid passage means are strategically spaced 90° around the interior of said cavity means.

4. The apparatus as recited in claim 3 wherein said forming mold includes a relatively tall surrounding ridge for defining at its base a peripheral portion of the finished product and said press mold includes a circumferential portion for mating contact with said ridge.

5. The apparatus as recited in claim 4 wherein said forming mold and said press mold each includes a pair of offset vertical portions for sliding contact with each other and connected by parallel oblique portions.

6. The apparatus as recited in claim 5 wherein other exits of said fluid passage means in said press mold are strategically spaced around said circumferential portion and at the oblique portion thereof and discharge into a circumferential chamber formed by said offset vertical portions.

7. The apparatus as recited in claim 1 wherein said forming mold and said press mold each includes a pair of offset vertical portions for sliding contact with each other and connected by parallel oblique portions.

8. The apparatus as recited in claim 7 wherein some of said exits of said fluid passage means are strategically spaced around said circumferential portion and at the oblique portion thereof and discharge into a circumferential chamber formed by said offset vertical portions.

9. The apparatus as recited in claim 6 wherein a wire screening is disposed on the working face of said forming mold.

* * * * *